United States Patent [19]
Shepherd et al.

[11] 4,341,130
[45] Jul. 27, 1982

[54] DUST AND OIL SLINGER

[75] Inventors: Michael Shepherd, Indianapolis; Robert C. Bremer, Jr., Brownsburg, both of Ind.

[73] Assignee: Wallace Murray Corporation, New York, N.Y.

[21] Appl. No.: 15,060

[22] Filed: Feb. 26, 1979

Related U.S. Application Data

[63] Continuation-in-part of Ser. No. 908,135, May 22, 1978, abandoned.

[51] Int. Cl.³ ................ F16F 15/10; F16C 1/00; F16C 3/00
[52] U.S. Cl. ................................. 74/574; 464/180
[58] Field of Search ............. 74/574; 64/1 V, 27 NM

[56] References Cited

U.S. PATENT DOCUMENTS

| | | | |
|---|---|---|---|
| 1,882,281 | 10/1932 | Griswold | 74/574 |
| 1,949,520 | 3/1934 | Whisler | 74/574 |
| 2,905,022 | 9/1959 | Goloff | 74/574 |
| 3,196,710 | 7/1965 | Peirce | 74/574 |
| 3,303,719 | 2/1967 | Beier | 74/574 |
| 3,373,633 | 3/1968 | Desmond et al. | 74/574 |
| 3,495,475 | 2/1970 | Rumsey | 74/574 |
| 3,640,149 | 2/1972 | McLean | 74/574 |

FOREIGN PATENT DOCUMENTS 814062  5/1959  United Kingdom ................. 74/574

Primary Examiner—Leslie Braun
Attorney, Agent, or Firm—Thomas J. Greer, Jr.

[57] ABSTRACT

A torsional vibration damper of the type having an inertia ring member and a hub member coupled together by an elastomer member. The hub member may be in the form of a disc and is adapted to be coupled to a rotating shaft subject to torsional vibrations, the elastomer and inertia ring member acting in a known manner to damp torsional vibrations. According to this invention a seal, termed a dust and oil slinger, is mounted on the hub. The seal overlies the elastomer and protects it from dust or other particles and from corrosive fumes and liquids. The seal may additional serve as a sacrificial member which will, in certain corrosive ambients, degrade prior to degradation of the elastomer connecting the hub and inertia ring. The seal is either integral with the working elastomer member, or is formed by adhering to the working elastomer member a sealing material of a different composition.

2 Claims, 2 Drawing Figures

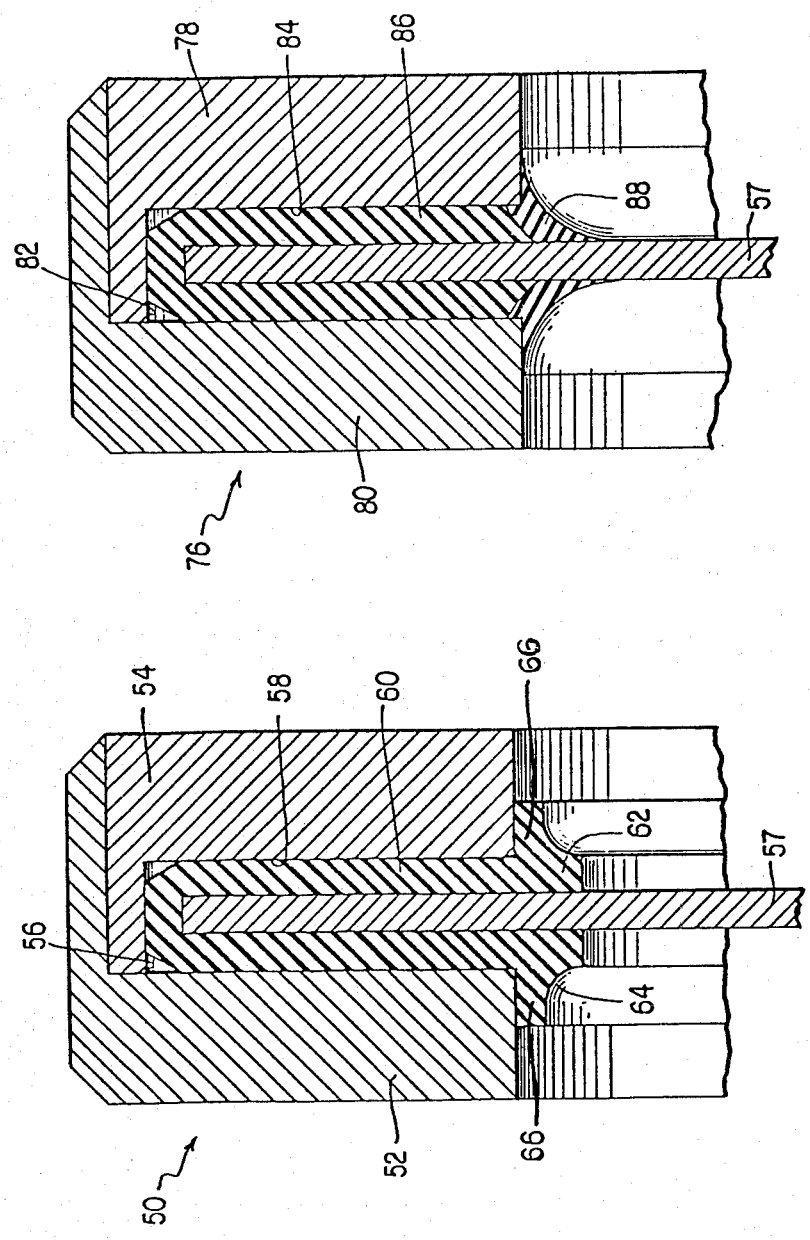

DUST AND OIL SLINGER

This is a continuation-in-part of application Ser. No. 908,135, filed May 22, 1978, entitled "Dust and Oil Slinger" now abandoned.

This invention relates to torsional vibration dampers of the type having a hub secured to an outer inertia member by an elastomer annulus.

The invention exhibits particular utility to the damping of torsional vibrations in internal combustion engines. Such dampers are generally classified at present in Class 74, Sub-class 574 in the U.S. Patent Office. Torsional vibrations may be considered as back-and-forth twistings of the crankshaft of an internal combustion engine, superimposed upon the main, uni-directional rotation of the crankshaft. Unless controlled, such torsional vibrations will often lead to failure of the crankshaft, as well as contributing to failure in other parts of the engine or its cooling system, particularly where one of the resonant frequency modes of the crankshaft coincides with the particular firing frequency of the engine or a particular harmonic of that frequency. According to present theory of elastomer vibration dampers, the torsional vibrational energy transmitted to the crankshaft by the action of the pistons is converted into heat in the elastomer. The elastomer may accordingly be considered as a drain or sump which continually receives a portion of the energy which causes torsional vibrations.

A common form of such a damping device includes an outer or inertia member in the form of a ring or annulus of some significant mass. The inner portion of this ring is secured to an elastomer annulus which, in turn, is secured to a hub or other element in turn attached to the rotating crankshaft of an engine. Both the hub and the inertia members may be of cast iron. As the crankshaft is turning, each incremental application of torque, as occasioned by rapid fuel combustion in a cylinder, results in a slight acceleration of the metal adjacent the crank arm. When the metal recovers, due to its natural elasticity or resilience, it rotates slightly in the opposite direction. Such forces result in torsional vibrations in the shaft. In a typical instance of torsional vibration, an engine crankshaft turning at a rate of 3000 rpm simultaneously executes angular vibrations of an amplitude of from one-fourth degree to one degree at a frequency of 150 to 250 cycles per second.

The purpose of a torsional vibration damper is to reduce the amplitude of torsional vibrations. Such reduction lowers the strength requirements of the crankshaft and hence lowers the weight of the crankshaft. The damper has a direct effect on the crankshaft and also inhibits vibration of various other components of the internal combustion engine which are affected by crankshaft vibration.

As an internal combustion engine is operated at various engine speeds, several vibrational frequencies appear on the crankshaft. In general, most automotive and diesel engines of present design and now utilizing a torsional vibration damper have one fairly high amplitude resonant frequency within the engine operating range of speeds. However, at any given engine speed, torsional vibrations from various orders of vibration are present and can be significant. According to this invention a seal is provided for the elastomer (termed the working elastomer) for the purpose of protecting it against degradation due to corrosive fumes and liquids and also against dust or other particulate material. The seal is carried by the disc and covers that part of the elastomer which is otherwise open to ambient. The seal is either formed integrally with the working elastomer, or by adhering to the working elastomer a sealing material of a different composition.

IN THE DRAWINGS

FIG. 1 is a longitudinal, axial, upper half cross-section of a torsional vibration damper which includes a seal formed in accordance with this invention.

FIG. 2 is a view similar to FIG. 1 and illustrates a second embodiment.

Referring now to FIG. 1 of the drawings, the numeral 50 denotes a torsional vibration damper and includes a two-part inertia ring 52, 54 assembled by any convenient, known technique. The numeral 56 denotes the radially outermost annular surface of an annular recess 58 into which extends the periphery of a disc 57. The disc is rigid, usually of metal, and is attached to the crankshaft of an internal combustion engine for rotation therewith. The numeral 60 denotes working elastomer positioned in recess 58, the disc 57 being bonded to the elastomer, and the elastomer, in turn, being bonded to the sides 58 of the inertia ring elements 52, 54. The working elastomer 60 thus surrounds and contacts the sides and the radially outermost periphery of the disc 57. The numeral 62 denotes an integral and radially inwardly extending extension of working elastomer portion 60, while the numeral 64 denotes a curved portion of portion 62. The numeral 66 denotes axially extending, flange portions of integral extension 62. The elastomer flange portions 66 abut the radially innermost, cylindrical surfaces of the inertia rings 52, 54, but are not bonded to them. Thus, inertia rings 52, 54 are free to execute relative rotational movement with respect to elastomer flanges 66. The torsional spring rate of the entire damper 50 is thus not affected by flange portions 66.

Curved portions 64 of integral extensions 62 function as slinger portions to throw, in an axial direction (normal to the plane of disc 57), any radially outwardly moving particulate matter, moving along disc 57 and striking integral extension portions 62. It will further be observed that integral extensions 62 of working elastomer 60 serve to protect the working elastomer portion 60 within annular recess 58 from the action of corrosive fumes, dust particles, and the like. The reader will immediately comprehend that this invention admits of economies in manufacture because only a single elastomer element is required.

Referring now to FIG. 2 of the drawings, the numeral 76 denotes a torsional vibration damper having an inertia ring 78, 80 conveniently formed in two parts and assembled by any convenient technique. The numeral 82 denotes the radially outermost portion of an annular groove 84 located within the damper 76, working elastomer 86 being positioned in the groove and being bonded, respectively, to the outermost portion of disc 57 and to the inner surfaces 84 of the annular groove. As before, disc 57 is attached to a shaft subject to torsional vibrations (not shown). The numeral 88 denotes a continuous, annular, yieldable seal compound of a composition different from that of working elastomer 86, such as RTV (room temperature vulcanization) elastomer or equivalent. The RTV or similar seal material does not affect the torsional vibration stiffness of the damper. Again, the shape of annular seals 88 is such to impart an axial component of velocity to any particulate material moving radially outwardly during rotation of the damper, while elements 88 serve to, as previously described, protect the working elastomer 86 from corrosive fumes or liquids. The seals 88 similar to elements 62, 66 of FIG. 1, do not affect or influence the torsional stiffness of the damper 76 with its working elastomer 86. Elastomer 88 may be chosen for a special protective or endurance property which may not be possessed by working elastomer 86.

The slinger portions 62, 66 of FIG. 1 and 88 of FIG. 2 are of an axial extent at least as great as the axial distance between the disc sides and the sides of the annular groove in the inertia ring into which working elastomer is positioned. It will be observed that the radially innermost portion of that groove is normally, in the prior art, completely open to ambient. Accordingly, without the presence of these slinger elements, dust, other particulate material, corrosive fumes, corrosive liquids or the like would be free to enter the opening. Once in the opening, depending upon the character of the foreign particles, vapors, or liquids, the working elastomer could be degraded, eroded or chemically attacked, or the particulate material might finds its way between the elastomer and the groove surfaces adjacent the opening, with consequent deterioration of the adhesive bond between the groove surfaces and the elastomer or deterioration of the interface between the groove surfaces and working elastomer.

What is claimed:

1. A torsional vibration damper of the type having an annular inertia ring mass coupled to a rotatable disc by means of working elastomer, the outer periphery of the disc extending into a complementary annular recess in the inertia ring mass, the working elastomer lining the interior portions of the said annular recess, the working elastomer surrounding and contacting the sides and the radially outermost periphery of the disc, the disc adapted to be coupled to a rotating shaft subject to torsional vibrations, the disc being of lesser axial extent than the inertia ring, the inertia ring mass, working elastomer, and disc acting in a known manner to lessen torsional vibrations of the shaft, the improvement comprising, an annular elastomer seal carried by the vibration damper, the seal being of an axial extent, as measured in a direction parallel to the axis of rotation of the damper, greater than the axial distance between the disc sides and the sides of the said annular recess, the seal being integral with the working elastomer in the annular recess, the seal extending on both sides of the disc, the seal not being bonded to said axially extending portions of the inertia ring mass, whereby the seal protects the elastomer in the annular recess by inhibiting entry into the annular recess of dust or other abrasive material or corrosive fumes or materials, the seal serving as a sacrificial member in corrosive environments.

2. The torsional vibration damper of claim 1 wherein the seal is integral, being generally U-shaped in longitudinal, axial, half cross-section.

* * * * *